United States Patent
Silzer, Jr.

(10) Patent No.: US 7,180,451 B2
(45) Date of Patent: Feb. 20, 2007

(54) ENDURABLE SPORTS PDA WITH COMMUNICATIONS CAPABILITIES AND ACCESSORIES THEREFOR

(75) Inventor: Robert Curtis Silzer, Jr., British Columbia (CA)

(73) Assignee: GPS Industries, Inc. (CA)

( * ) Notice: Subject to any disclaimer, the term of this patent is extended or adjusted under 35 U.S.C. 154(b) by 508 days.

(21) Appl. No.: 10/349,146

(22) Filed: Jan. 22, 2003

(65) Prior Publication Data

US 2004/0001022 A1 Jan. 1, 2004

(51) Int. Cl.
*H01Q 1/24* (2006.01)
(52) U.S. Cl. .................. 343/702; 343/873
(58) Field of Classification Search .......... 343/702, 343/873; 455/89, 90.3
See application file for complete search history.

(56) References Cited

U.S. PATENT DOCUMENTS

| | | | | |
|---|---|---|---|---|
| 4,057,359 A | * | 11/1977 | Grooman | 415/9 |
| 5,719,771 A | * | 2/1998 | Buck et al. | 455/456.5 |
| 6,016,423 A | * | 1/2000 | Ross et al. | 455/90.3 |
| 2003/0013418 A1 | * | 1/2003 | Kato | 455/90 |

* cited by examiner

*Primary Examiner*—Tan Ho
(74) *Attorney, Agent, or Firm*—Fitch, Even, Tabin & Flannery

(57) ABSTRACT

A PDA apparatus that is ruggedized by providing a peripheral bumper and a raised bezel, both of which can be made of rubber or some other elastic material for absorbing shock when the PDA is in use in the field. The PDA can also have an antenna which is also part of the peripheral bumper or that is inset to minimize damage to the antenna. The antenna receives signals from a remote location such as a global positioning so that the PDA can display useful information to the user. In a golf context, this could be the distance from the user to a golf hole. The casing of the PDA can also be made of ballistic nylon so that handles for carrying the PDA can be easily sewn onto the housing and so that the housing can further resist any shock from the environment. If the case of the PDA is hard, there can be sockets provided where the handle can be easily attached or detached using a pair of nuts. A lanyard may be provided in lieu of handle to allow the user to easily transport the PDA. Furthermore, the PDA may have a retractable stand that allows the user to set the PDA on the ground and still be able to see the monitor while the user engages in another activity, thereby facilitating the access to the information by the user.

18 Claims, 14 Drawing Sheets

Fig. 2A  HORIZONTAL ANTENNA

Fig. 2B  ANTENNA/BUMBER

REMOVABLE HANDLE/INSET ANTENNA

STAND & LANYARD

ENDURABLE SPORTS PDA WITH COMMUNICATIONS CAPABILITIES AND ACCESSORIES THEREFOR

BACKGROUND OF THE INVENTION

1. Field of the Invention

The present invention relates to hand held personal digital assistants that can be used in the field for sports and the like to help users assimilate information that can help them improve their performance.

2. Description of the Related Art

Presently personal digital assistants are routinely used to perform specific tasks such as acting like an electronic diary, carry-along personal database, multimedia player, personal communicator, memo taker, calculator, and alarm clock. The communication capabilities of these devices are achieved by a variety of means. One such means is accomplished by hooking up the PDA to a computer by wire. Another method is using an infrared link. Yet another way is by using a modem or phone line. Finally, the communication can take place using wireless technology. The advantage of PDA as compared to more traditional PCs is their compact size and ease of transport.

These features make PDA the preferred device for obtaining and carrying information when the user is on the move. However, the potential of these devices to help sports enthusiasts and others in the field has not been fully explored. One reason for this shortcoming in the prior art is that these devices are not rugged enough to withstand the shock or any other trauma that may occur to them in the field. Another reason why this potential has not been tapped is because these devices lack the features necessary to allow the user to perform the physical operations necessary for the sport or other activity while still being able to see the monitor or screen of the PDA, which displays the necessary information that is transmitted to it via a remote signal.

Accordingly, there exists a need for a PDA that is rugged enough to be used in the field while still being able to convey the information necessary to the user to enhance the user's performance in whatever activity he or she wishes to engage.

SUMMARY OF THE INVENTION

The present invention relates to a ruggedized PDA with communications capabilities, allowing the user to receive information that enhances his or her ability to perform tasks in the field. These tasks can take the form of playing golf and the necessary information related to the user by the PDA could be the distance from the user's position to the golf hole, thereby allowing the user to accurately gauge how far to hit the ball and which golf club is most appropriate. The distance could be determined by a global positioning system that then relates the information to the PDA which displays the distance on its monitor so an user can see and use the information.

The PDA can be ruggedized by providing a bumper around the periphery of the PDA that is made of rubber or some other suitably elastic material that can absorb any shock that the PDA might encounter in the field. Furthermore, there can also be a raised bezel located along the periphery of the monitor to protect the screen from any shock that could cause damage to the display of the PDA. In some cases, the bumper may also serve as the antenna, thereby reducing the size of the PDA and minimizing the risk of damage to the antenna. A strap or straps may also be provided thereby allowing the user to carry the PDA. In yet another form of the invention, the case of the PDA can be made of ballistic nylon fabric, allowing the handles to be sewn onto it. This type of PDA can also have a metallic bezel that surrounds and supports the monitor of the PDA in order to provide suitable protection and rigidity to the delicate monitor screen.

Another possible variation of the invention is one where the PDA has locations on either its left or right side where a handle can be readily attached or detached. This allows the user to carry the PDA conveniently in any manner he or she wishes. In addition, the PDA may also have an inset antenna for picking up signals from the GPS or any other source. The inset antenna has a low profile, making the PDA as compact as possible to ease its transport and reducing the risk of damage to the antenna.

Finally, another version of the PDA could have a lanyard for carrying the PDA and a retractable stand for standing the PDA up. This way the user can look down at the monitor to see where and how far away the hole is from his or her current position while getting ready to hit a golf ball. This version of the PDA can also have an emphasized drive/score button which the user can push to get information such as the score of the game or the distance to a hole.

As can be seen, the features described above provide for a ruggedized PDA that is capable of withstanding shock and other trauma in the field while, at the same time, allowing the user to obtain the information necessary to enhance his or her performance with respect to any activity they engage in while in the field.

BRIEF DESCRIPTION OF THE DRAWINGS

The novel features believed to be characteristic of the invention are set forth in the appended claims. The invention itself, however, as well as the preferred mode of use, further objectives and advantages thereof is best understood by reference to the following detailed description of the embodiments taken in conjunction with the accompanying drawings and appendix, wherein:

DETAILED DESCRIPTION OF THE PREFERRED EMBODIMENTS

Figure 1A:
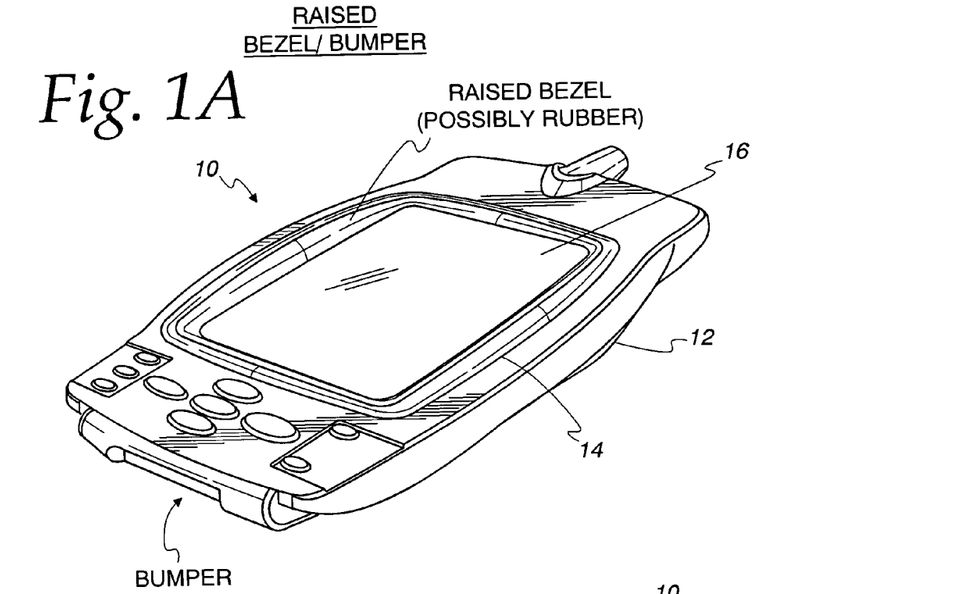
FIG. 1A shows one form of the present invention having a peripheral bumper and a raised bezel in a perspective view.
Figure 1B:
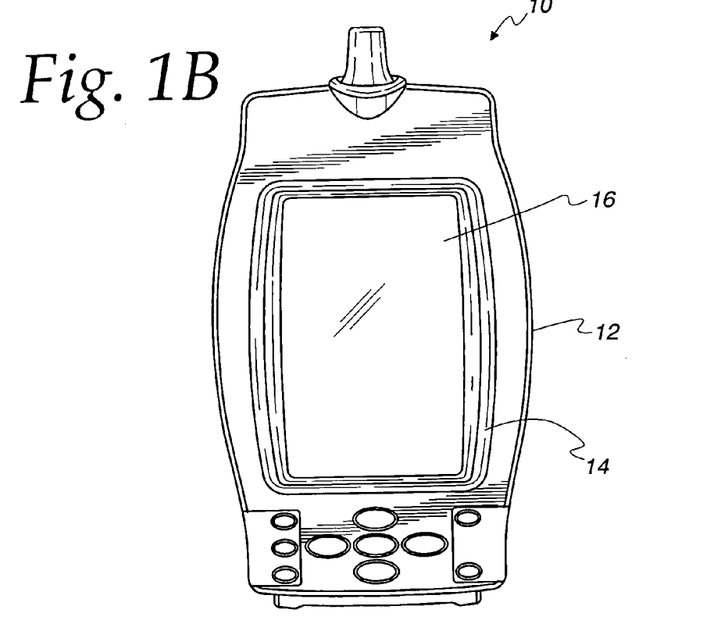
FIG. 1B shows a plan view of the device of FIG. 1A.

With reference to FIGS. 1A and 1B, a ruggedized PDA 10 with a peripheral bumper 12 and raised bezel 14 is provided. The peripheral bumper 12 can be made of a rubber or any other elastic material that is capable of absorbing any shock that the PDA 10 may encounter in the field. This in turn will protect the delicate circuitry within the PDA 10 from damage should it be subjected to shock. Furthermore, the raised bezel 14 can also be made of rubber or some other suitably elastic material so that it too can absorb any shock from the environment. In this way, the bezel 14 can protect the delicate screen or monitor 16 of the PDA 10 from damage as the user moves about in the field.

Figure 2A:
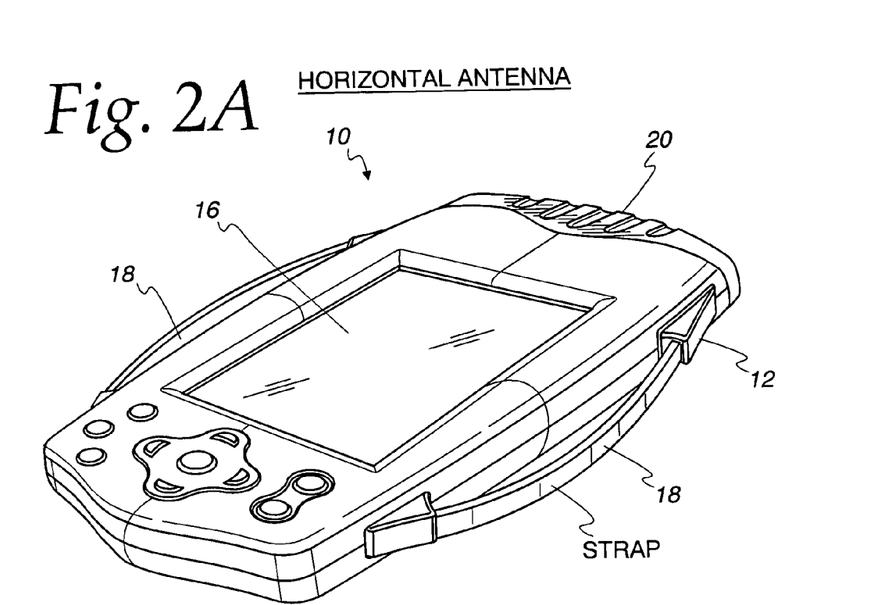
FIG. 2A shows another form of the present invention having a carrying strap and a bumper/antenna in a perspective view.
Figure 2B:
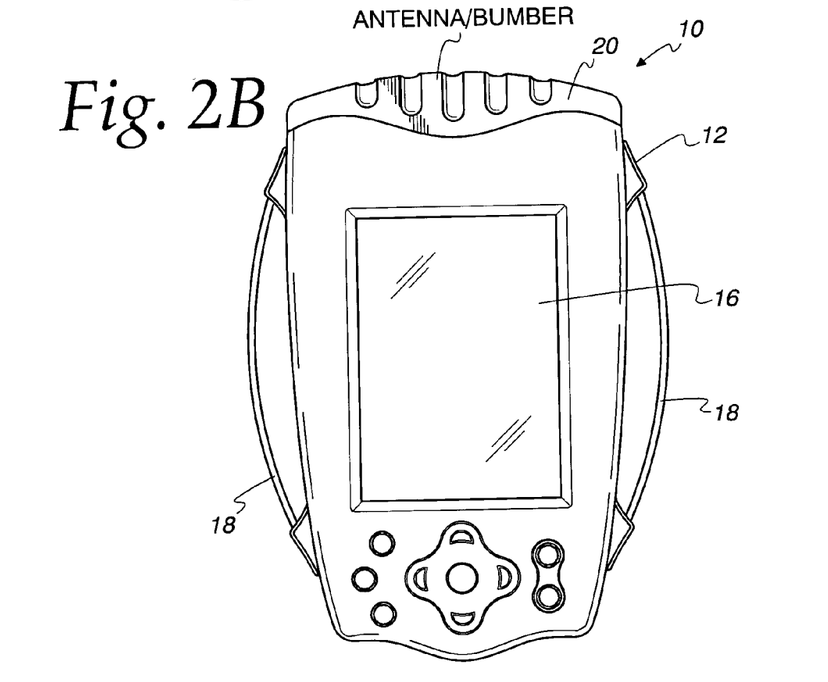
FIG. 2B shows a plan view of the device of FIG. 2A.

Looking at FIGS. 2A and 2B, there is depicted a PDA 10 with a strap 18 for carrying the PDA 10. This PDA 10 also includes an antenna/bumper combination 20 that serves a dual function. First, the antenna/bumper 20 serves to protect the delicate circuitry housed within the PDA 10. Second, the antenna/bumper 20 also receives a signal from a remote location such as a global positioning system and conveys that signal to the circuitry within the PDA 10 which then shows the necessary information on the monitor 16 of the PDA 10. In order to perform both of these functions simultaneously, the antenna/bumper 20 must be made of some composite material that is partially rubber (or some other suitably elastic material) and metal.

Figure 3A:
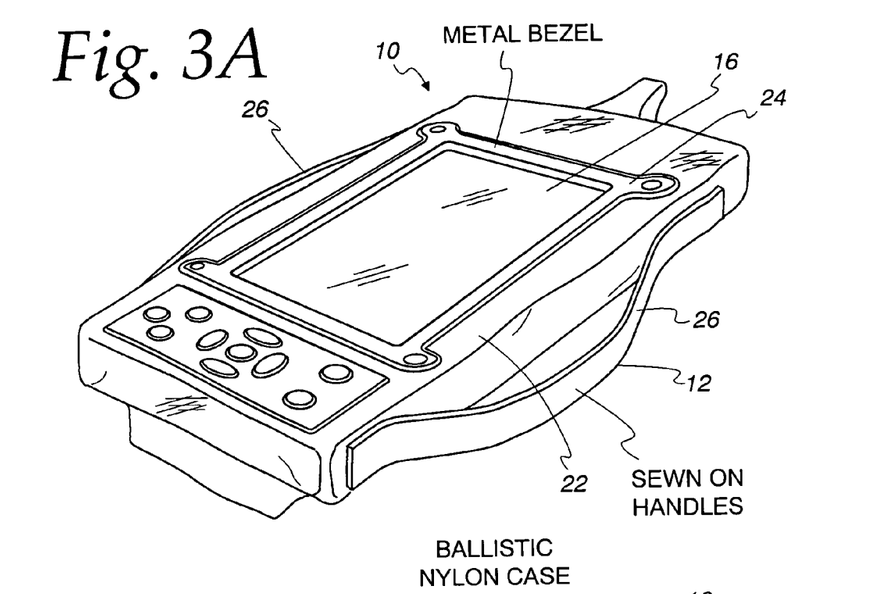
FIG. 3A shows another form of the present invention having a case made of ballistic nylon fabric with sewn on handles in a perspective view.
Figure 3B:
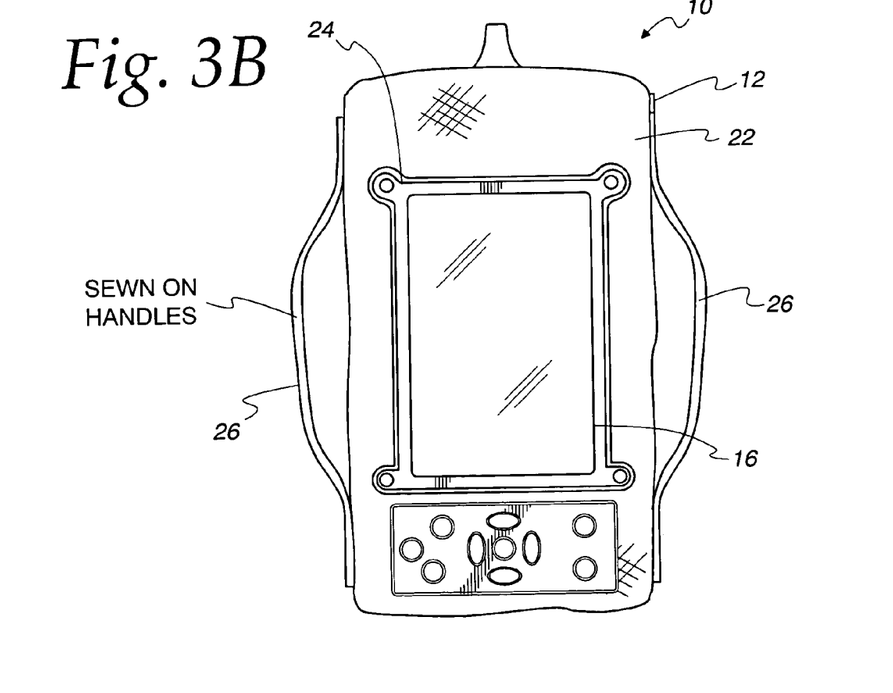
FIG. 3B shows a plan view of the device of FIG. 3A.

Now turning to FIGS. 3A and 3B, a PDA 10 with a casing 22 made of a ballistic nylon fabric and a metallic bezel 24 is shown. The advantage of this construction is that the PDA 10 has a soft case which can hide nicks and marks better than can a PDA 10 with a hard case as well as cushion any blow the PDA 10 might receive during use. This construction also allows handles 26 to be easily sown onto the case, giving the user a easy way to grab hold onto the PDA 10. The metallic bezel 24 provides sufficient rigidity to support and protect the monitor 16 of the PDA 10 from damage.

Figures 4A, 4C:
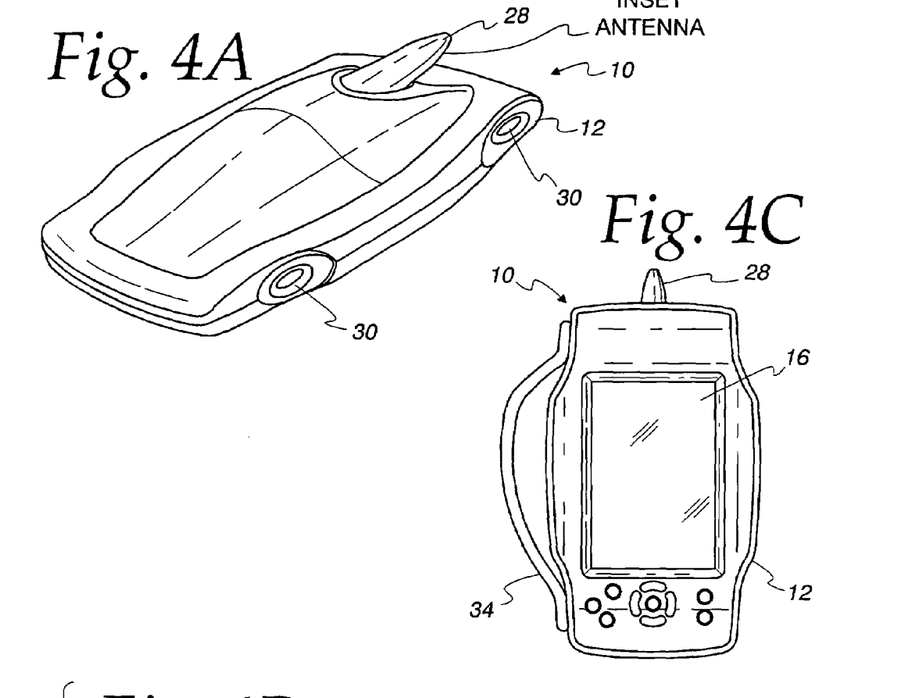
FIG. 4A shows another version of the invention having an inset antenna in a perspective view.
FIG. 4C shows the plan view of the device of FIG. 4A.
Figure 4B:
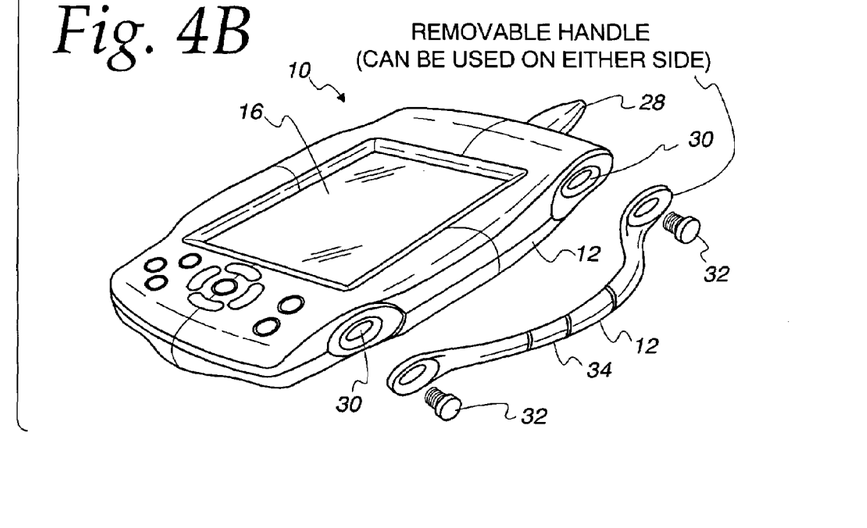
FIG. 4B shows an exploded assembly view of the device of FIG. 4A showing how the removable handle can be readily attached and detached.

Yet another form of the present invention is shown in FIGS. 4A thru 4C. This PDA 10 has an inset antenna 28 and sockets 30 which are capable of receiving nuts 32 for readily attaching and detaching a handle 34. These sockets 30 are located on both the left and ride sides of the PDA 10 so that the handle 34 can be attached to either side, allowing the user to carry the PDA 10 in any manner he or she wishes. The inset antenna 28 allows the PDA 10 to receive information remotely while minimizing the risk of damage to the antenna 28 because of its small profile.

Figure 5A:
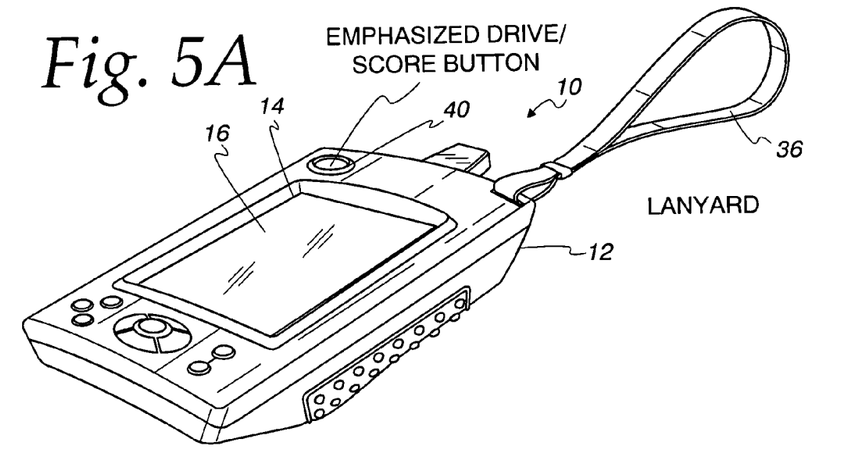
FIG. 5A shows another version of the invention having a lanyard and emphasized drive/score button in a perspective view.
Figure 5B:
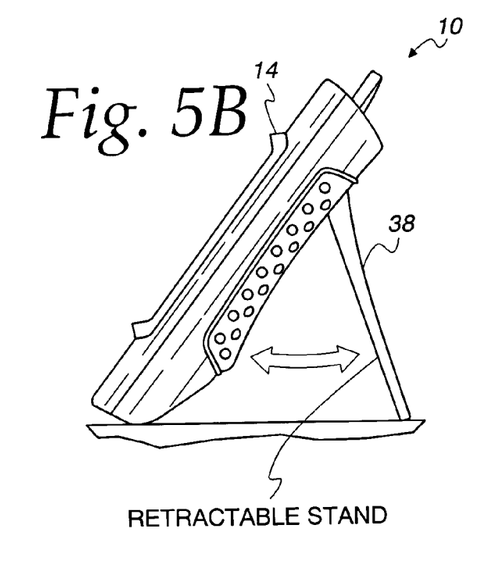
FIG. 5B is right side view of the device of FIG. 5A with its retractable stand extended.
Figure 5C:
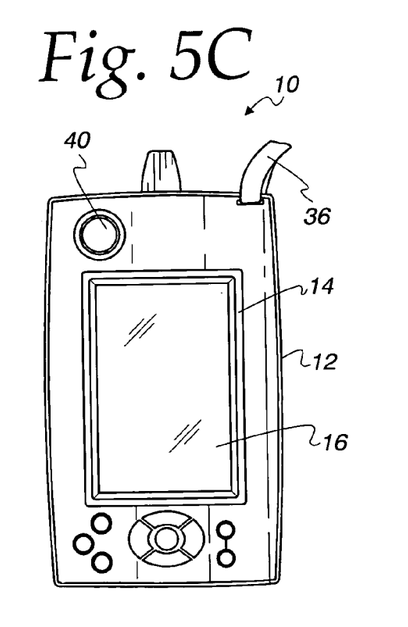
FIG. 5C is a plan view of the device of FIG. 5A.
Figure 6A:
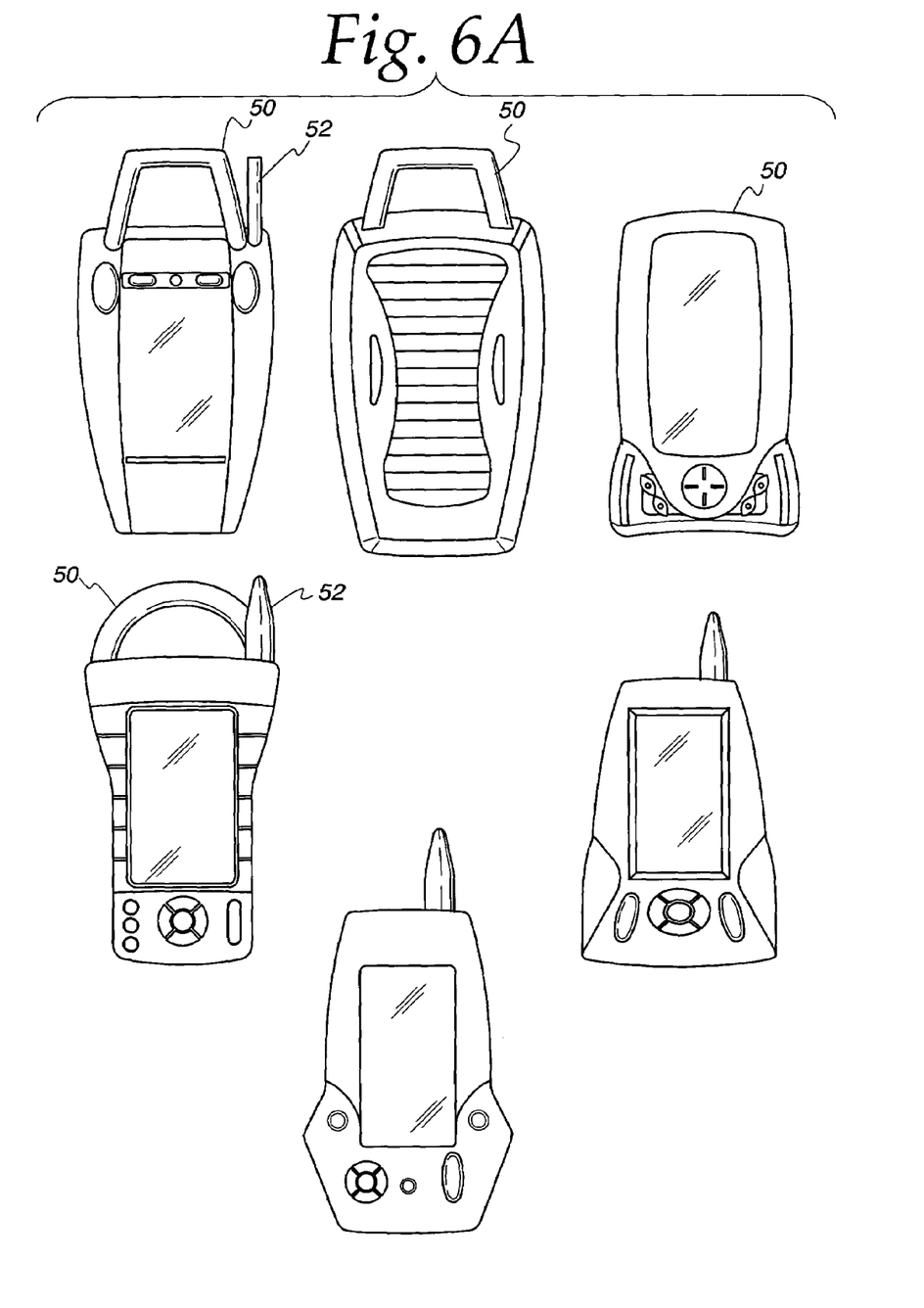
FIGS. 6A–6I illustrate various alternate embodiments in accordance with the present invention.
Figure 6B:
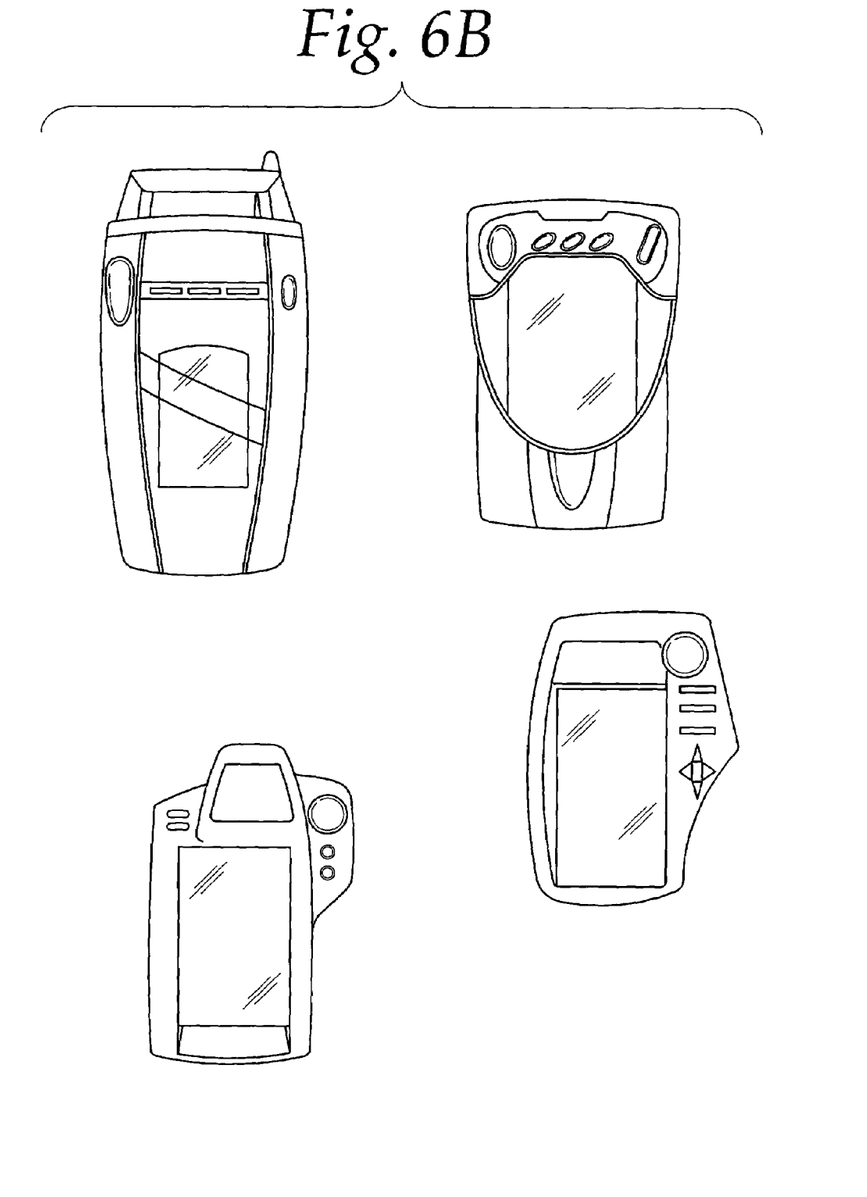
Figure 6C:
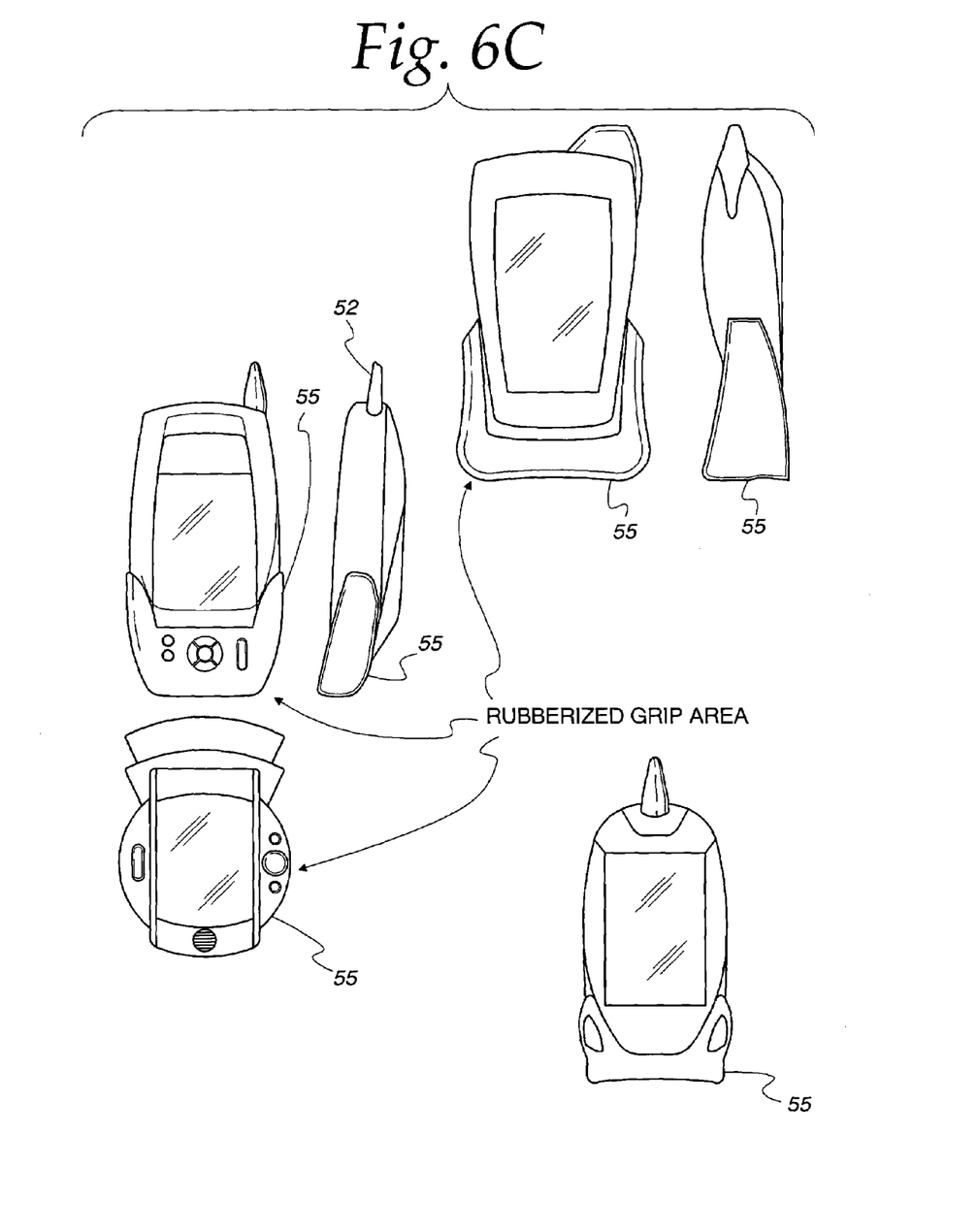
Figure 6D:
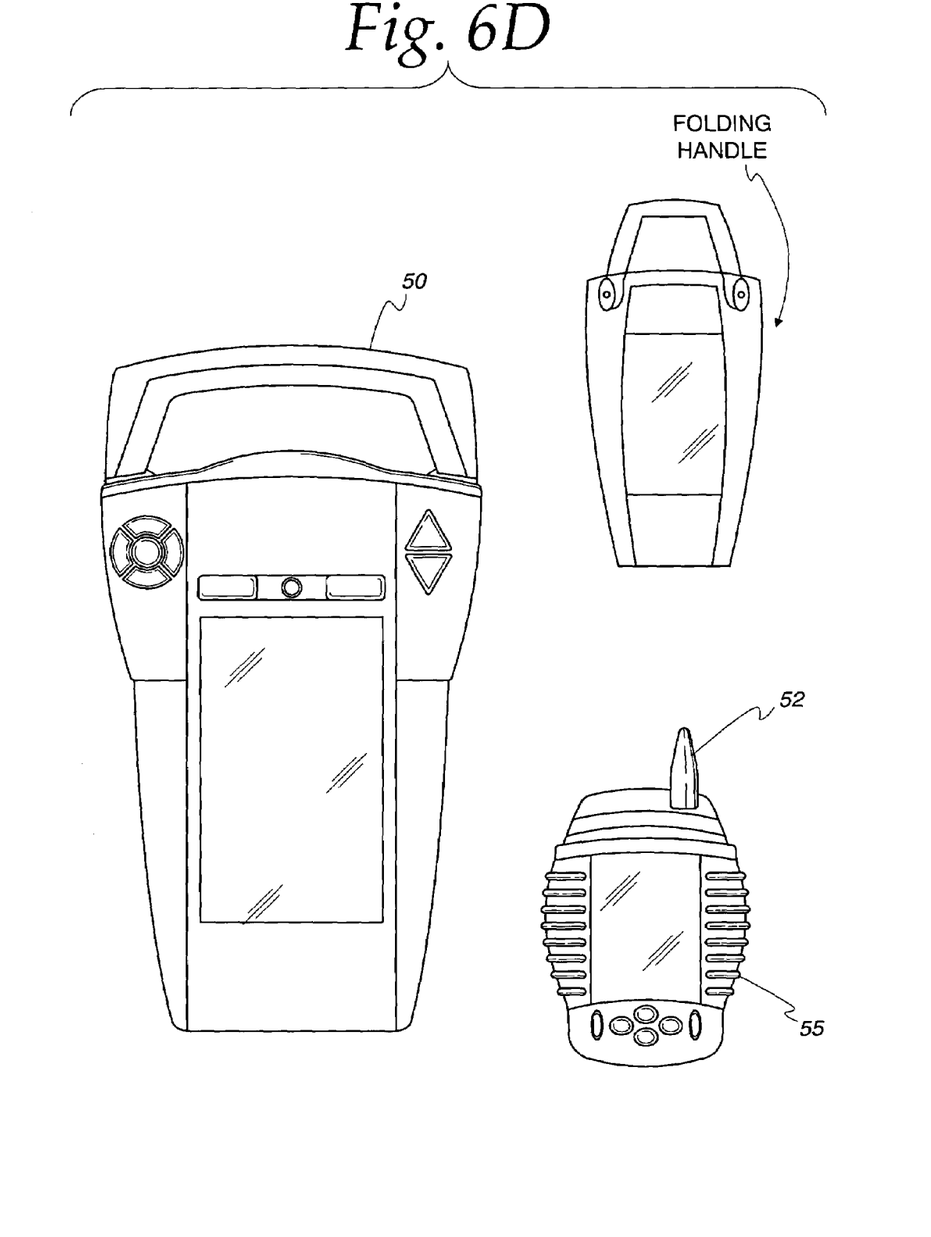
Figure 6E:
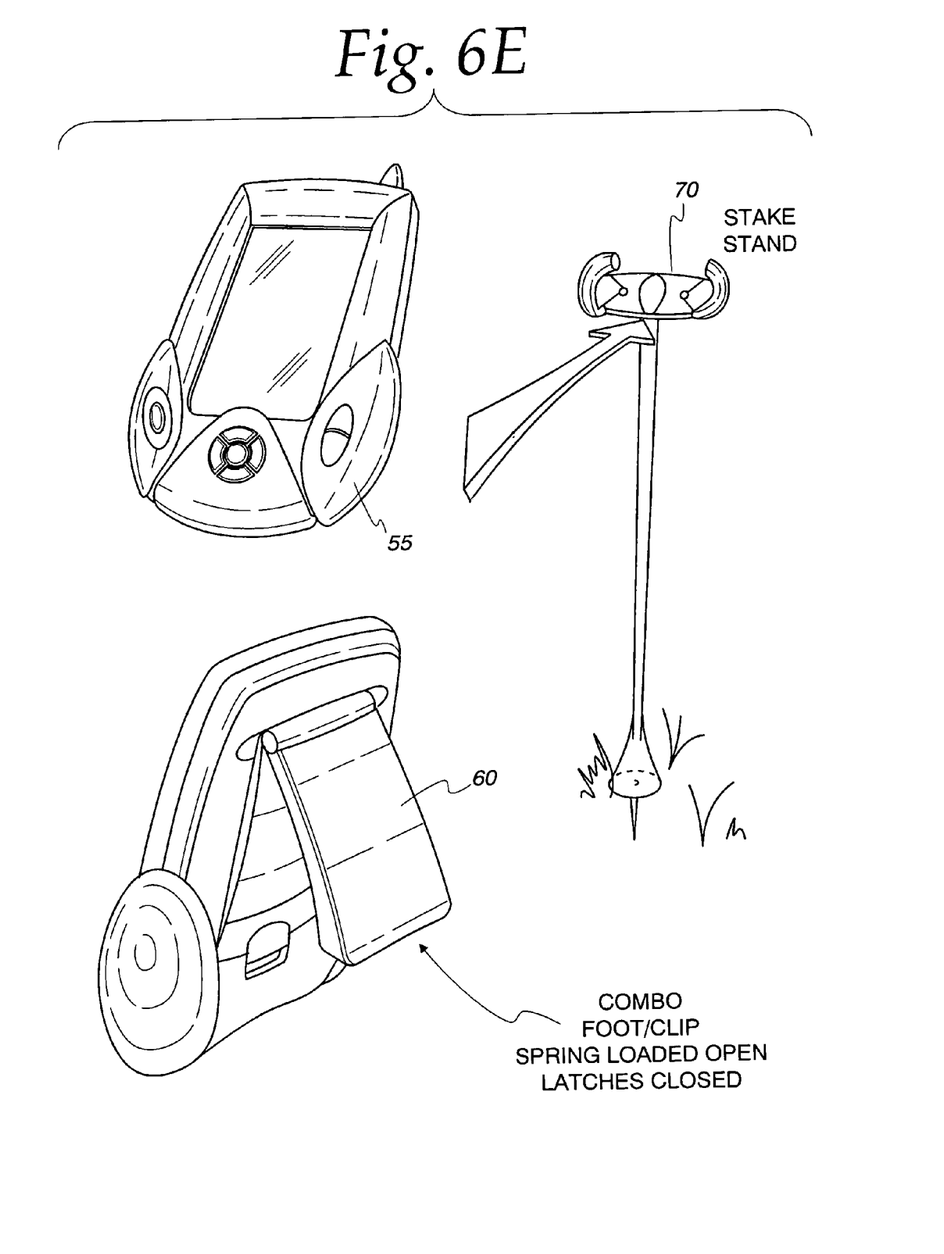
Figure 6F:
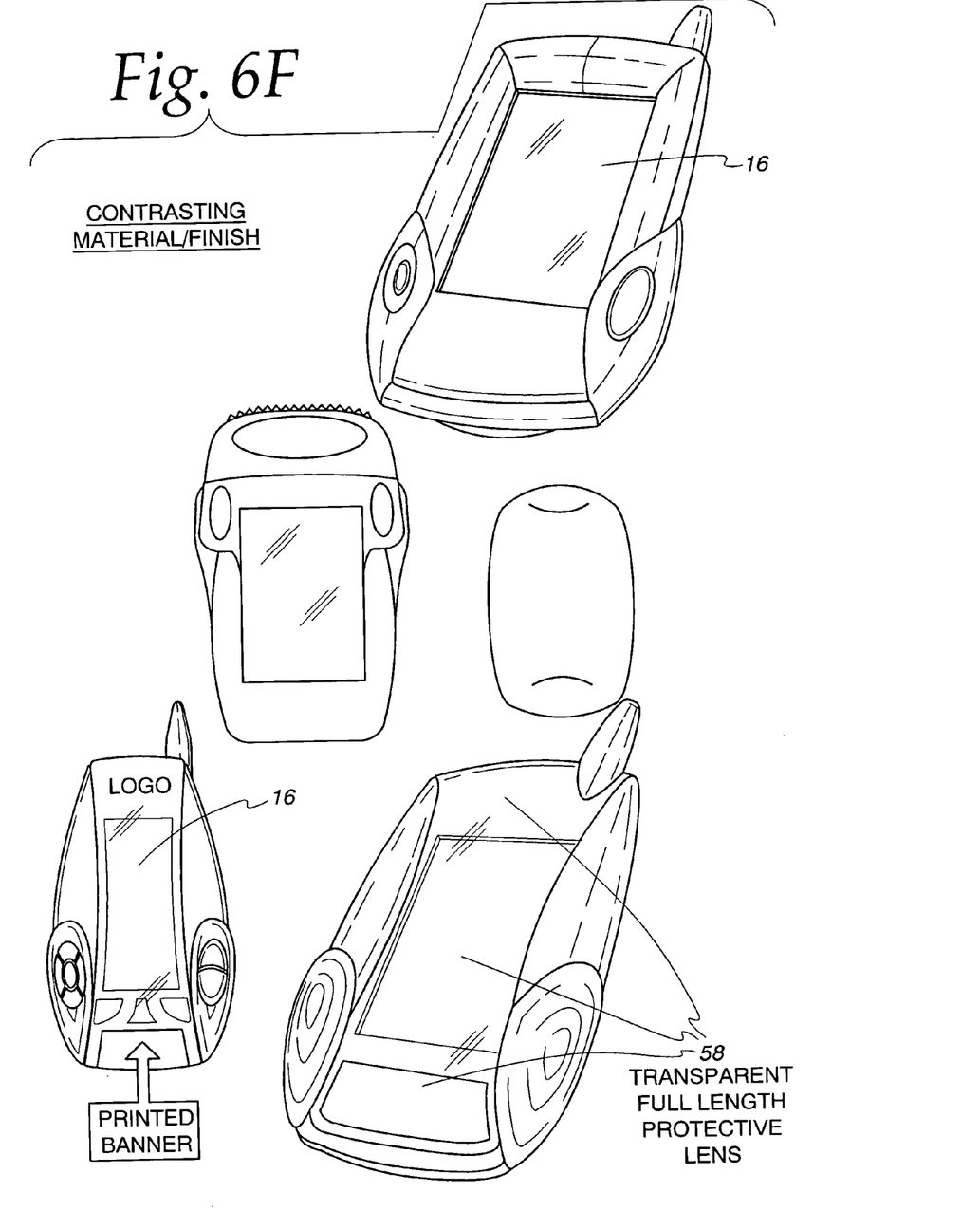
Figure 6G:
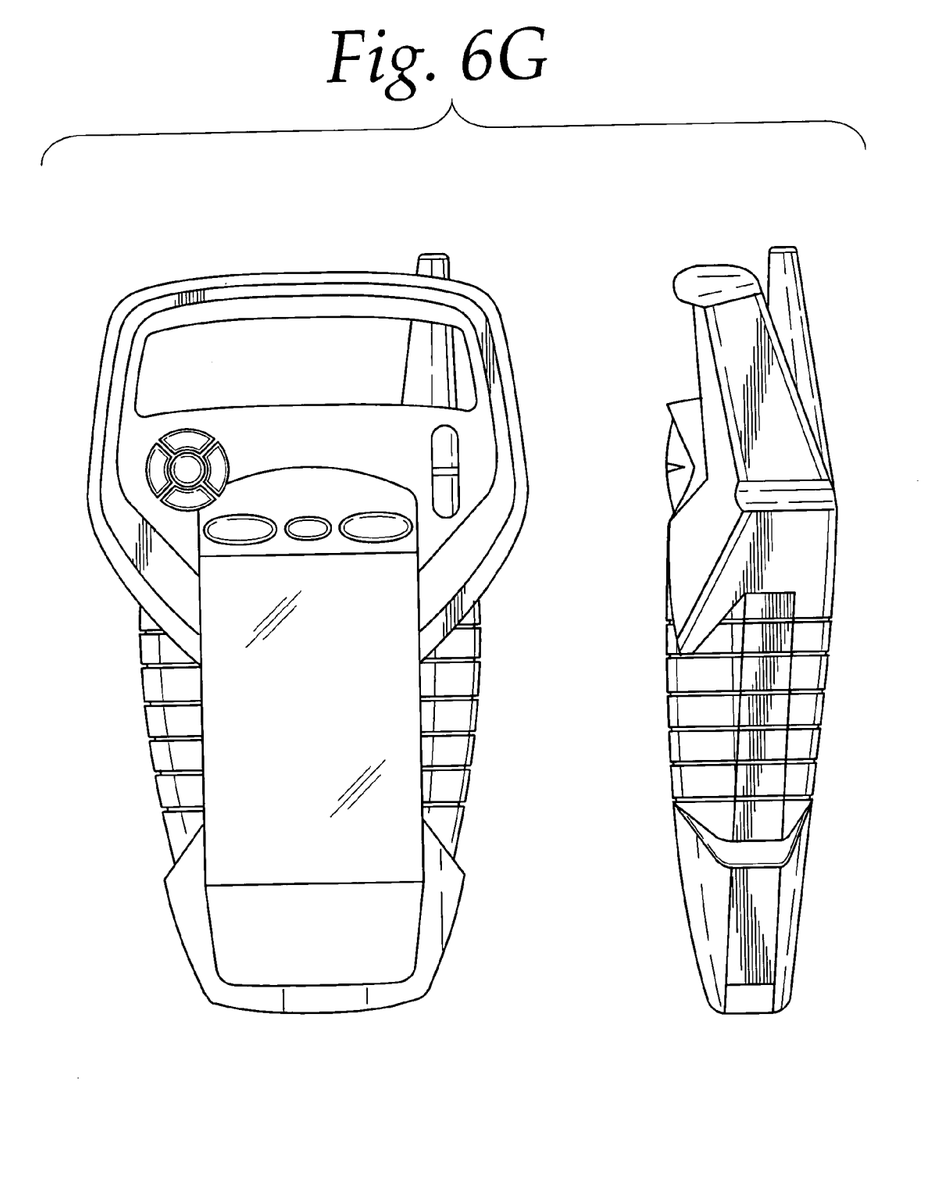
Figure 6H:
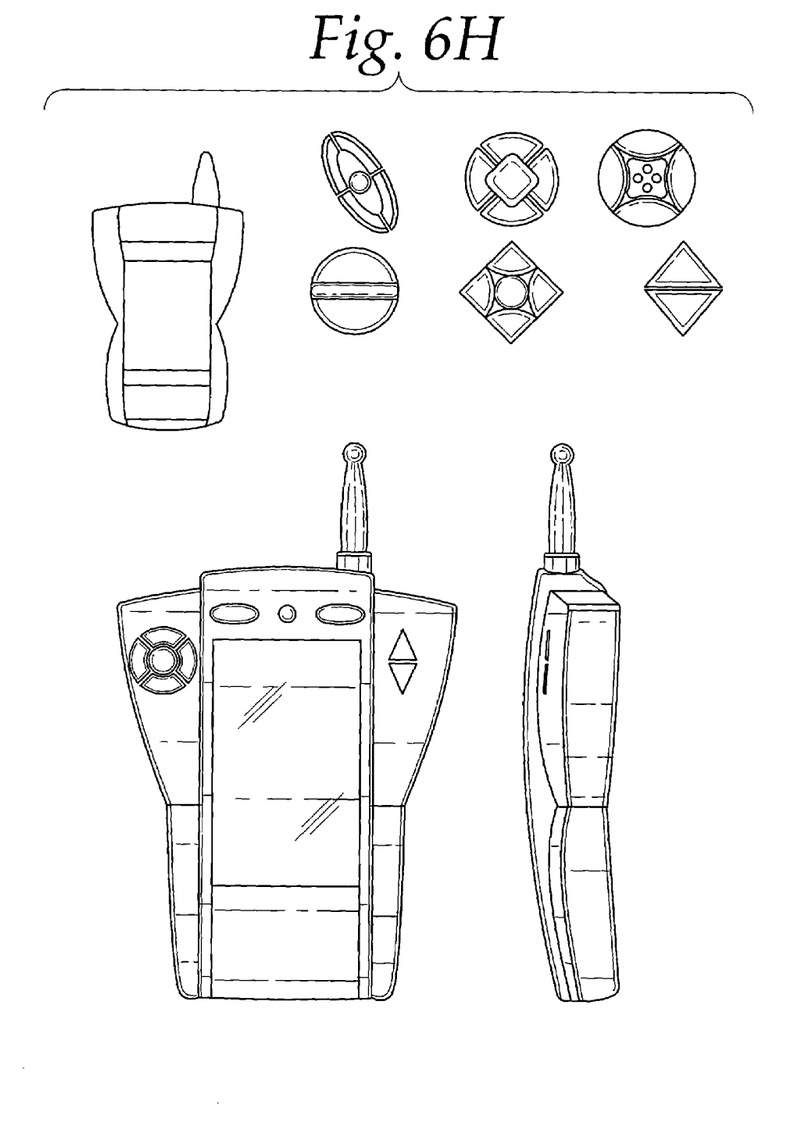
Figure 6I:
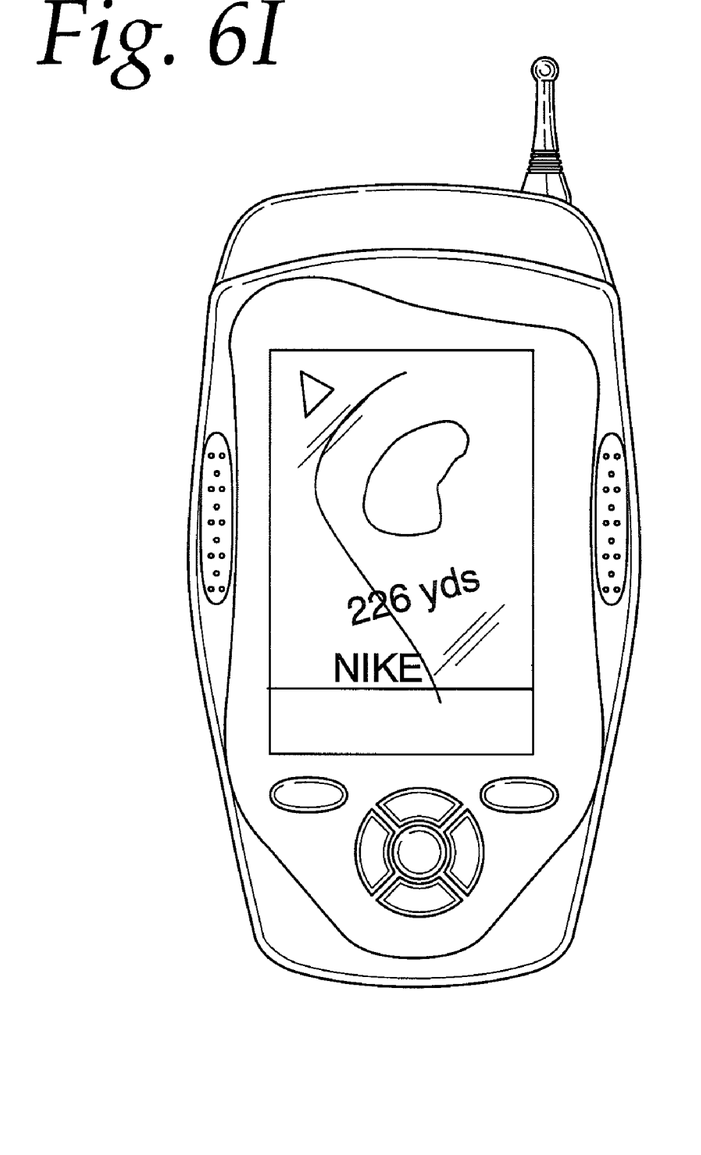

FIGS. 5A thru 5C show yet another PDA that is in conformity with the present invention. This PDA 10 includes a lanyard 36 by which the user can easily carry the PDA 10 by slipping the lanyard 36 over his or her wrist or neck. This PDA also has a retractable stand 38 which can be extended during use so it can stand on its own when placed on the ground or some other suitably flat surface. In this position, the monitor 16 points at slightly upward angle so that the user can easily see the desired information such as the score or the distance to a golf hole after pressing the drive/score button 40. This arrangement gives the user the freedom to tee up for a shot while still being able to see the desired information by glancing quickly down at the monitor 16 of the PDA 10. A number of the PDAs and accessory embodiments described herein facilitate ease of use. In addition, FIGS. 6A–6I illustrate various alternate embodiments of the PDA. FIGS. 6A and 6G show a PDA having a combination of an attached handle 50 and an inset antenna 52, which allows the user to carry the PDA and to receive information at a remote location. The handle may be made of some composite material such as rubber, or some other suitably elastic material, and work as a bumper preventing the PDA from shock. FIG. 6B shows embodiments with a thumb grip positioned accommodate left-handed individuals. The PDA presented in FIGS. 6C and 6I has a rubberized grip area 55 which also may be made from some suitable elastic material to prevent the hand holding the device from slipping and also preventing the device from damage. The embodiment shown in FIG. 6D has a folding handle 50, antenna 52 and a rubberized grip area 55, which also works as a bumper. The PDA of FIG. 6E has a grip area 55 and a combo foot/clip spring loaded open/closed latches, so that the handset may be installed on a stake stand 70 in the field. The embodiments of FIGS. 6F and 6H have a nested display 16 and a full length protective lens 58, which may be made from elastic transparent material.

It should be appreciated that a wide range of changes and modifications may be made to the described embodiments, and thus it is intended that the foregoing detailed description be regarded as illustrative rather than limiting and the following claims, including all equivalents are intended to define the scope of the invention.

The invention claimed is:

1. An endurable portable data collection and communication field device, comprising
    an antenna;
    a monitor with an LCD screen; and
    a housing having a peripheral bumper and provided with ability to absorb shock and prevent the device from damage during field activities,
    wherein the antenna is inset and combined with the peripheral bumper.

2. The device of claim 1, wherein the peripheral bumper is made of shock absorbing elastic material.

3. The device of claim 2, wherein the elastic material comprises rubber.

4. The device of claim 1, comprising a raised bezel located at the peripheral edge of the monitor to protect the screen from damage.

5. The device of claim 4, wherein the raised bezel is made of shock absorbing elastic material.

6. The device of claim 1, comprising at least one handle.

7. The device of claim 6, wherein the handle is detachably attached to a side of the housing.

8. The device of claim 1, comprising a rubberized grip area.

9. The device of claim 8, wherein the rubberized grip area having a thumb grip to accommodate left-handed users.

10. The device of claim 8, wherein the rubberized grip area having a thumb grip to accommodate right-handed users.

11. The device of claim 1, comprising a retractable stand for installing the device in a position so that the monitor is easily visible to a user during field activity.

12. An endurable sports PDA with communications capabilities, comprising:
    a low-profile inset antenna to receive information for enhancing performance of players;
    a monitor with an LCD screen to display the information; and
    a housing with a peripheral bumper, the housing provided with ability to absorb shock and prevent the device from damage during field activities,
    wherein the antenna is combined with the bumper.

13. The device of claim 12, wherein the peripheral bumper is made of a shock absorbing elastic material.

14. The device of claim 12, comprising drive/score button to provide information enhancing player's performance.

15. The device of claim 12, comprising a folding handle.

16. An endurable portable data collection and communication field device, comprising
- an antenna;
- a monitor with an LCD screen; and
- a housing made of ballistic nylon fabric and provided with ability to absorb shock and prevent the device from damage during field activities.

17. The device of claim 16 comprising a rigid raised bezel located at the peripheral edge of the monitor to provide support and protection to the monitor.

18. The device of claim 17, wherein the housing comprises at least one strap allowing to carry the device.

* * * * *